United States Patent
Driediger et al.

(12) 
(10) Patent No.: US 6,760,764 B1
(45) Date of Patent: Jul. 6, 2004

(54) REAL TIME STAMP DISTRIBUTION

(75) Inventors: Steve G. Driediger, Kanata (CA); John S. Gryba, Ottawa (CA); Charles H. Mitchell, Nepean (CA)

(73) Assignee: Alcatel Canada Inc., Kanata (CA)

( * ) Notice: Subject to any disclaimer, the term of this patent is extended or adjusted under 35 U.S.C. 154(b) by 867 days.

(21) Appl. No.: 09/635,069

(22) Filed: Aug. 9, 2000

(51) Int. Cl.[7] .................................. G06F 15/173
(52) U.S. Cl. ................. 709/224; 709/204; 709/228; 709/246; 713/178
(58) Field of Search .......................... 704/204–207, 704/224, 228, 235, 246, 248; 713/178

(56) References Cited

U.S. PATENT DOCUMENTS

| | | | | |
|---|---|---|---|---|
| 5,913,031 A | * | 6/1999 | Blanchard | 709/204 |
| 6,092,118 A | * | 7/2000 | Tsang | 709/246 |
| 6,119,147 A | * | 9/2000 | Toomey et al. | 709/204 |
| 6,470,449 B1 | * | 10/2002 | Blandford | 713/178 |
| 6,529,954 B1 | * | 3/2003 | Cookmeyer et al. | 709/224 |
| 6,564,382 B2 | * | 5/2003 | Duquesnois et al. | 725/100 |
| 6,674,803 B1 | * | 1/2004 | Kesselring | 375/240.26 |

* cited by examiner

Primary Examiner—Bharat Barot
(74) Attorney, Agent, or Firm—Marks & Clerk

(57) ABSTRACT

A real time stamp distribution system for multi-element/multi-processor networks. A master network element derives a real time stamp (RTS) from a source and distributes the RTS to the remaining network elements. A combination of distribution methods are discussed including a dedicated hardware connection, hardware and software messaging and a method wherein a high precision stamp is derived from an oscillator located on each network element. In one embodiment the system has a drift adjustment feature to compensate for a system time stamp drift relative to the real time. Redundancy can be provided by employing multiple master timekeeper elements. The RTS in one application has three timing components; a high precision portion; an intermediate precision portion and a low precision portion. The intermediate portion can be implemented using shifter based counters such as a linear feedback shift register. Pulse width modulated encoding and decoding can be used to transport the intermediate real time stamp from the master timekeepers to the other network elements in the system.

20 Claims, 4 Drawing Sheets

REAL TIME STAMP DISTRIBUTION

FIELD OF THE INVENTION

This invention relates to multiprocessor architectures and multi-element networks and more particularly to the distribution of a real time stamp through such networks and multiprocessor systems.

BACKGROUND

In multi-element networks including networks incorporating multiprocessor systems it is frequently desirable for each network element and microprocessor to have a common real time stamp. This real time information will typically include a range of time components including year, month, day, hour, minute, etc. The information may be required for a number of reasons including but not limited to billing and debugging. In a billing application, for example, a multi-element network might be associated with a communication system in which it is important that the element that records timing data and the element that services a connection have a common date and time reference. In a debugging application accurate sequence timing information can prove extremely important in isolating a network or system problem. Although a time stamp for billing purposes may involve relatively low precision timing levels such as day, hour, minute, and second, debugging requirements may involve high precision timing references, down to the microsecond range. Having a common platform that will service both needs will keep resources down.

In any event there is a requirement in multi-element networks to provide a real time stamp which may range, for example, from the current year down to the exact microsecond. Ideally, the broad range of time stamp information is distributed by a single system to preserve scarce system resources.

At present, multiprocessing systems and multi-element networks send time of day information from a master timekeeping element to other processors and elements of the system through software messages. Software messages are typically carried over shared buses and as such are subject to network delays. As a result low precision timing information is generally not problematic while high precision time stamps tend to be unreliable. The delay introduced by the network may result in the time stamp arriving at an element after the valid time. A second problem with software messaging is that in order to achieve a certain level of accuracy time stamps must be delivered frequently. This can result in a significant portion of a system's resources being dedicated to time stamp distribution rather than using system bandwidth for its intended functionality.

SUMMARY OF THE INVENTION

The present invention provides systems and methods of delivering a real time stamp to elements and microprocessors in multi-element/multiprocessor networks utilizing one or more improved delivery modes.

According to one aspect of the invention the time stamp is delivered via a hardware connection between the master timekeeper element and the respective elements/microprocessor.

According to further aspects of the invention the time stamp is delivered via combinations of software messaging, hardware connection and element-based timekeeping systems.

The present invention also provides for means associated with the master timekeeper element to derive a current real time stamp from an outside source for use in controlling drift in the distributed time stamp. Therefore, in accordance with a preferred broad aspect of the invention there is provided a system for distributing a real time stamp (RTS) between network elements in a multielement network comprising: timing means at a master network element to derive a real time stamp; encoding means at the master network element to encode the real time stamp; and distribution means to distribute the real time stamp (RTS) to each remaining network element.

BRIEF DESCRIPTION OF THE DRAWINGS

The invention will now be described in greater detail having reference to the attached drawings wherein.

DETAILED DESCRIPTION OF THE INVENTION

Figure 1:
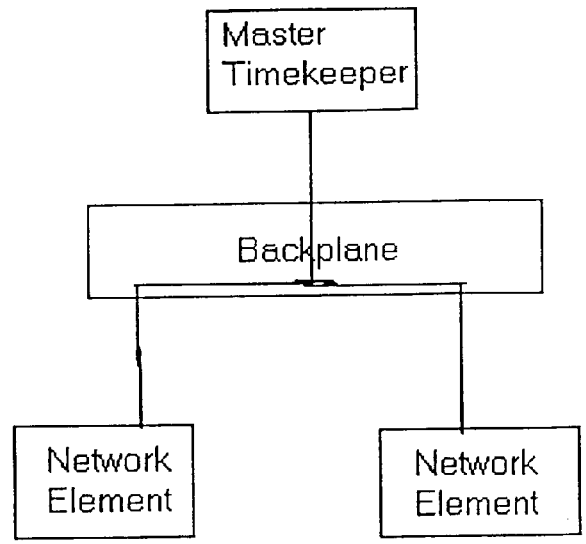
FIG. 1 is a high level block diagram of a multi-element network as contemplated by the invention.

FIG. 1 is a high-level block diagram of a multiprocessor/multi-element system as contemplated by the present invention. The system includes a master timekeeper or control element that maintains a real time stamp (RTS) for the entire system. The real time stamp typically will be derived from an outside time source as will be discussed later. This RTS is distributed across the backplane to the network elements through one of the Real Time Stamp Distribution (RTSD) schemes as discussed below. Although FIG. 1 shows the network elements in separate boxes in certain applications the RTS will be distributed from, for example, a master line card to other line cards within the same box or shelf as well as between the master and remote boxes.

As indicated previously in current multi processing system/multi element networks the time of day is sent from the master timekeeper processor/network element to other processors/elements of the system through software messages. According to one embodiment of the present invention the time of day available at the master timekeeper element is encoded into a RTS. This encoded RTS is then sent from the master timekeeper processor/network element to all the other processors/elements of the system through a dedicated hardware line. Since the dedicated hardware line is transporting the time of day the aforementioned delay encountered by sending the time of day through software messages will not occur. This will ensure that the time of day will always arrive at the processors/elements in the period for which that time of day is valid. Secondly, the dedicated hardware line serves to free up the bandwidth that would normally be used to send the time of day for use in serving other functionality. This allows the system to provide effective use of its messaging bandwidth.

As also discussed previously the RTS covers a very wide range of time components, such as the current year down to precise microseconds. According to a second embodiment of the invention the RTS is divided into two portions namely a higher precision portion and a lower precision portion. The higher precision portion of the time of day is encoded into a RTS by the master timekeeper element and sent to all of the other processors/elements of the system through a dedicated line. The lower precision portion of the time of day is sent through software messaging from the master timekeeper element to all of the other processors/elements of the system. For example, the year, month, and day portions of the real time would be sent through a software message while the hour, minute, second and fractions of a second are encoded on the RTS and send over the dedicated hardware line. The exact division on which portion of the time of day is encoded into a RTS and which portion is distributed through software messaging is dependent on the multi processor/network element system.

The lower precision portion of the time of day is sent through software messaging because the delay through software messaging would not affect it as it would affect a higher precision portion of the time of day. The division of which portion of the time of day that is encoded into a RTS and which portion is distributed through software messaging should take into account the guaranteed longest delay through the system. For example, if the longest delay through the system is just under an hour, then time components smaller than an hour should be encoded into the RTS and time components longer than an hour could be sent through software messaging.

By using a combination of RTS distribution and software messaging to deliver the time of day to processors/elements of the system a better use of resources and bandwidth are achieved instead of using both methods separately. For example, if a system only has RTS to distribute the time of day more resources are need to encode and decode the whole time of day compared to a system that only encodes and decodes a portion of the time of day. Also, in the system that uses only software messaging to distribute the time of day, more bandwidth will be needed and the delay encountered by the system would invalidate the time of day compared to a system that used both methods.

According to a further embodiment the higher precision portion of the RTS, distributed through hardware, is further subdivided into intermediate and higher precision portions. The intermediate precision portion of the RTS is then distributed to all of the other elements of the system through a dedicated line. An oscillator that updates a counter in each module of a network element maintains the higher precision portion of the time of day. When a time of day value is needed the lower and intermediate precision portions of the time of day from the RTS are added to the higher precision portion of the time of day represented in the counter. On every occasion that an element receives a time of day update through the dedicated hardware line the higher precision counter for each module is restarted. This has the effect of synchronizing all the high precision counters in the system.

The exact division of the portion of the time of day which is encoded into the RTS, the portion distributed through software message and the portion which is maintained through an oscillator and counter is dependent on the multi processor/network element system. For example, a system may require that all elements in the system have a time of day accuracy of a second but all modules in an element must have microsecond accuracy and the system can only guarantee that the longest delay through the system for a software message is just under an hour. In this example the year, month and day for the time of day will be distributed through software messaging, the hour, minute and second portion of the time of day are encoded in the RTS and sent over a dedicated hardware line and a one megahertz oscillator in the network element will update the counter for each module having a requirement for a microsecond accuracy. By using this combination the optimum use of software messaging bandwidth and hardware resources can be used to maintain the time of day through a system with a RTS.

Figure 2:
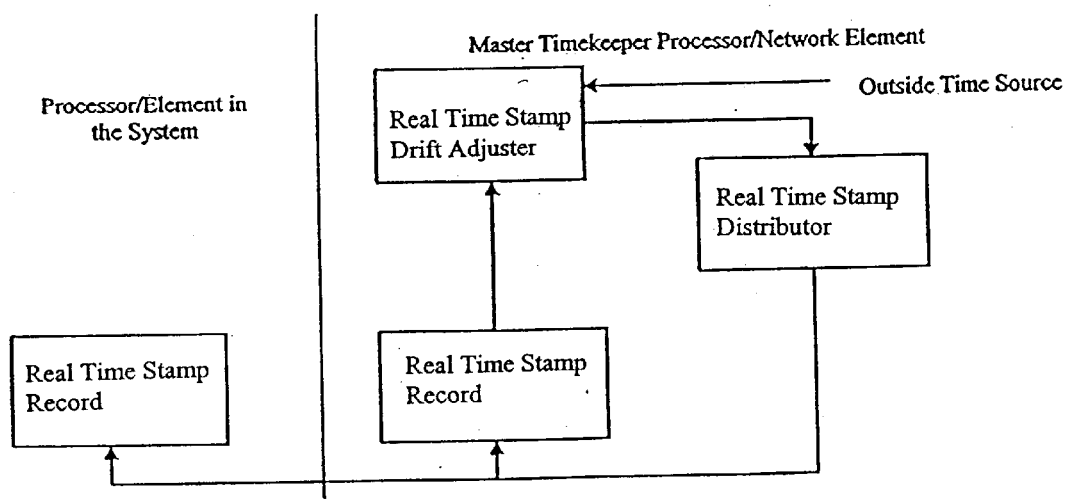
FIG. 2 is a block diagram of a real time stamp distribution system.

As in any time of day distribution system the RTS distribution of the present system is also prone to drift. Of course, the master timekeeper element will continually or at least periodically obtain the current real time from an outside source. According to a further embodiment of the present invention and as shown in FIG. 2 a RTS drift adjuster is added to the master timekeeper element. This features serves to adjust the RTS for any drift that may occur. Also as shown in FIG. 2 the master timekeeper processor/network element keeps a record of the RTS that is distributed to all the other processors/elements in the system. It compares the stored value with the RTS as derived from the outside time source. If the distributor drift adjuster determines that a drift is occurring it updates the RTS that it is distributing using the drift adjuster to account for any drift that has occurred.

As previously discussed, certain implementations of the RTSD system use an oscillator/counter combination on the element to provide a higher precision time stamp. Typically, the oscillator relies on an update received in the encoded RTS received by hardware to update its counter. Sometimes an error in the system can cause the RTS to be updated and distributed to the other processors/elements in the system before it should. This situation will result in a RTSD Underrun Error. An Underrun Error occurs when the intermediate precision value of the time of day is updated before a certain set of values of the higher precision value of the time of day are exhausted. The requirements of the system will be used to set the level of the values that can cause a RTSD Underrun Error. The Underrun Error detection feature on the network element will allow the element to determine if an error has occurred. In this embodiment the error detection feature will check the value of the higher precision value of the time of day that is maintained by the counter in the processor network element whenever an intermediate precision update occurs. If this value is a value that should have occurred before the RTS is updated then the RTSD Underrurn Error detection feature will indicate that an Underrun Error has occurred. A further embodiment of this invention tolerates such an Underrun Error by deferring the update until all said values have been exhausted.

In the same way that Underrun Error might occur the system may also be subject to an Overrun Error. A RTSD Overrun Error occurs when the intermediate precision value of the time of day is not updated before a certain set of values of the higher precision value of the time of day are exhausted. In a further embodiment of the invention the RTSD Overrun Error detection feature will check the value of the higher precision value of the time of day that is maintained by the counter of the processor/network element. If this value is a value that should not have occurred because the RTS is not yet updated then the Overrun Error detection feature will indicate that an Overrun Error has occurred. A further embodiment of this invention compensates for this Overrun Error by causing a forced update when the error is detected. The value used for this update is described later on in the patent.

According to a further embodiment, the encoding of the intermediate portion of the real time stamp (IRTS) is performed by a deterministic pattern, which is known by all the receiving network elements. As such, each network element can predict the value of the next IRTS update. This facilitates an error detection and correction scheme. Specifically, a Data Error is detected when an IRTS update is received and is found to be inconsistent with the next IRTS value in the pattern. A further embodiment of this invention corrects such an error by using the predicted IRTS value for the update.

The ability of the receiving network elements to predict the next IRTS value, along with the ability of the network elements to predict the occurrence of the next update facilitates a free-run mode of operation. The high precision counter is used to predict the next update's occurrence in time. A further embodiment of this invention allows the receiving network elements to automatically enter this free-run mode of operation when a number of Underrun, Overrun and/or Data Errors occur, or in the event of a loss of the master timekeeper.

A further value in using a predictable IRTS pattern involves synchronizing the lower precision, software distributed portion of the RTS. When software receives a low precision RTS update, it records this locally, but does not use it until the last IRTS value of the pattern is reached. Thus, the software distributed portion of the RTS does not need to reach the network element receivers until the last IRTS pattern is reached. This relaxes the latency and delay variation constraints on the software messaging system. The software on the master timekeeper must also be notified when the last IRTS value is reached so that it may transmit a new low precision RTS component to the network element receivers.

In a further embodiment, a Software Message Error can be detected. This error occurs when the last IRTS value is reached and no low precision RTS update has been received by the software on the receiving network element. This can be corrected by the receiving network element software, as the duration of the full IRTS pattern is deterministic.

In a further embodiment of this invention, flags are raised in the event of Underrun, Overrun, Data and/or Software Messaging Errors.

A further embodiment of this invention uses a shifter-based counter to implement the IRTS pattern. In a shifter-based counter pattern $(T_n)$, each value can be determined from the previous value according to the following formula, $$T_n = 2^m * T_{n-1} + f(T_{n-1})$$

where $f(T_{n-1})$ is an m-bit value derived from $T_{n-1}$. Using a shifter-based pattern allows the next value in the pattern to be determined simply by transmitting the m-bit value $f(T_{n-1})$ to the IRTS receiving network elements. By not transmitting all bits of the IRTS value with each update, system resources are minimized. If the receiving network elements implement a simple shift register as their IRTS receiving circuit, then a receiving network element can be synchronized within k/m updates, where k is the number of bits of an IRTS value. This places an upper bound on the time that a network element will be out of synch with the rest of the master timekeeper. When synchronizing a network element, the network element simply needs to count the number of updates received. Once it has received k/m updates, the network element can be assured that it is synchronized with the master timekeeper. Before these initial k/m updates have been received, the network element can keep its own time using the high-precision counter and by counting the number of updates which have been received. However, it is not synchronized with the master timekeeper during this time.

In a further embodiment of this invention, a linear feedback shift register (LFSR) pattern is used as the IRTS pattern. The advantages of using a LFSR pattern include ease of implementation, and a maximal length of $2^k-1$ patterns. This encoding scheme results in a pseudo-random pattern that can be decoded by software. Software may use a static lookup table, or can mimic the algorithm in real time to decode the LFSR pattern into a linear binary pattern.

In a further embodiment of this invention, a pulse-width modulated (PWM) encoder is used to encode both the IRTS update time, as well as the next m-bit update to be shifted into the receiving register, when m=1. This encoding scheme requires a signal hardware signal to distribute the IRTS update to all receiving network elements. This minimizes system resources.

Figure 4:
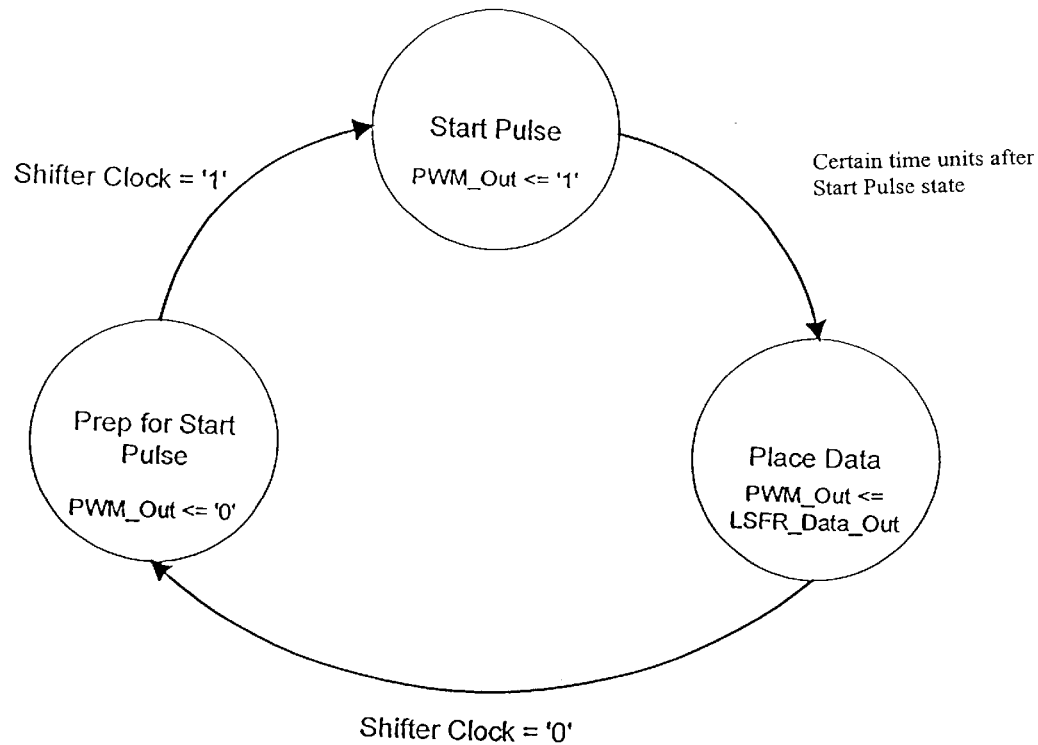
FIG. 4 is a Pulse Width Modulation (PWM) encoder state machine.
Figure 5:
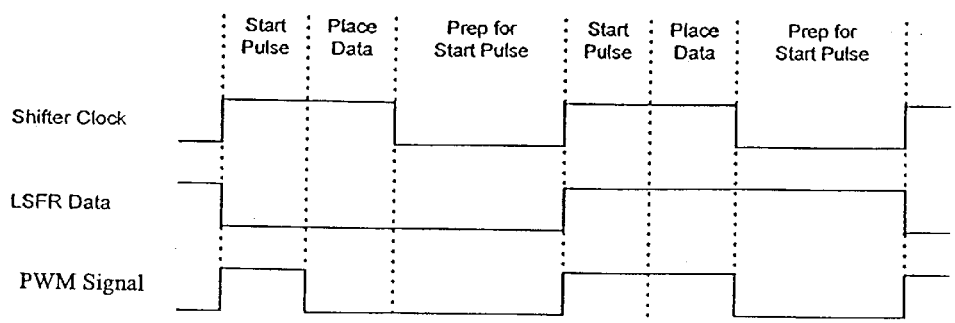
FIG. 5 shows the relationship of PWM encoder signals.
Figure 6:
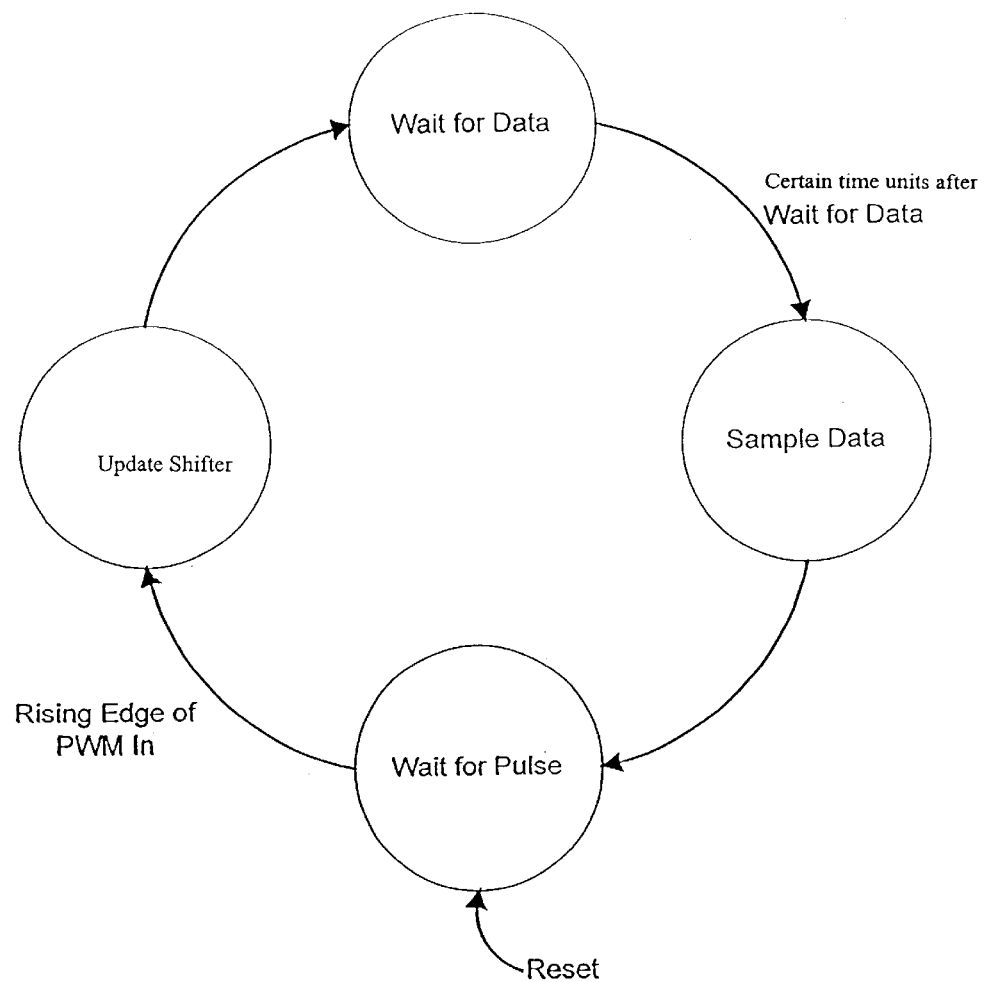
FIG. 6 is a PWM decoder state machine.
Figure 7:
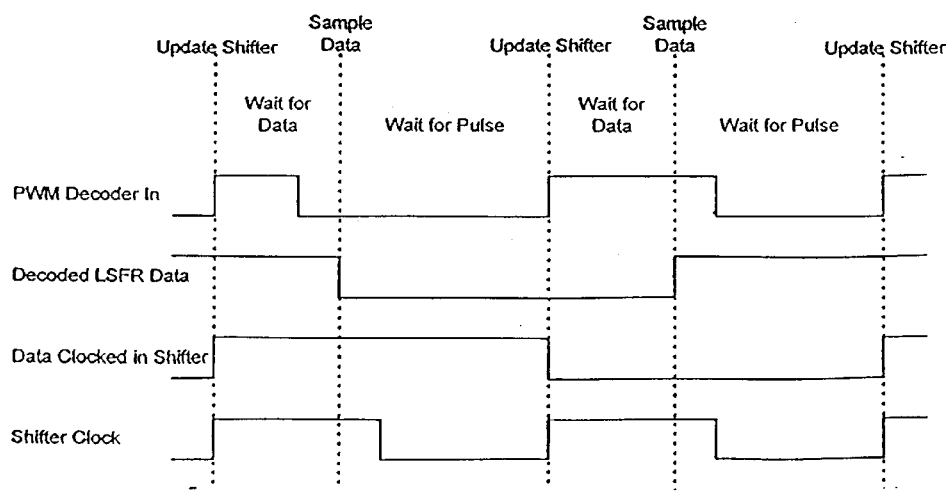
FIG. 7 shows the relationship of PWM decoder signals.

FIG. 4 shows a state machine which can be used to produce the PWM encoded signal shown in FIG. 5 from the shifter clock and LFSR data inputs. Initially, the state machine is in the "Prep for Start Pulse" state. When the shifter clock rises, the state machine transitions to the "Start Pulse" state and the PWM output is set to a value of '1'. After a certain period of time, the LFSR update data is placed on the PWM output signal, and the state machine moves to the "Place Data" state. After a certain period of time, the PWM output signal is set to a value of '0' and the state machine transitions back to the "Prep for Start Pulse" state. A PWM decoder state machine is depicted in FIG. 6, and FIG. 7 illustrates the decoded signals. Initially, the decoder state machine is in the "Wait for Pulse" state. A rising edge of the PWM signal causes this to transition to the "Update Shifter" state and the receiving shift register is updated with the last received data bit. Following the update, the state machine moves to the "Wait for Data" state. After a certain time, the transition is made to the "Sample Data" state and the next counter update bit is sampled from the PWM signal. After sampling, the state machine returns to the "Wait for Pulse" state.

Figure 3:
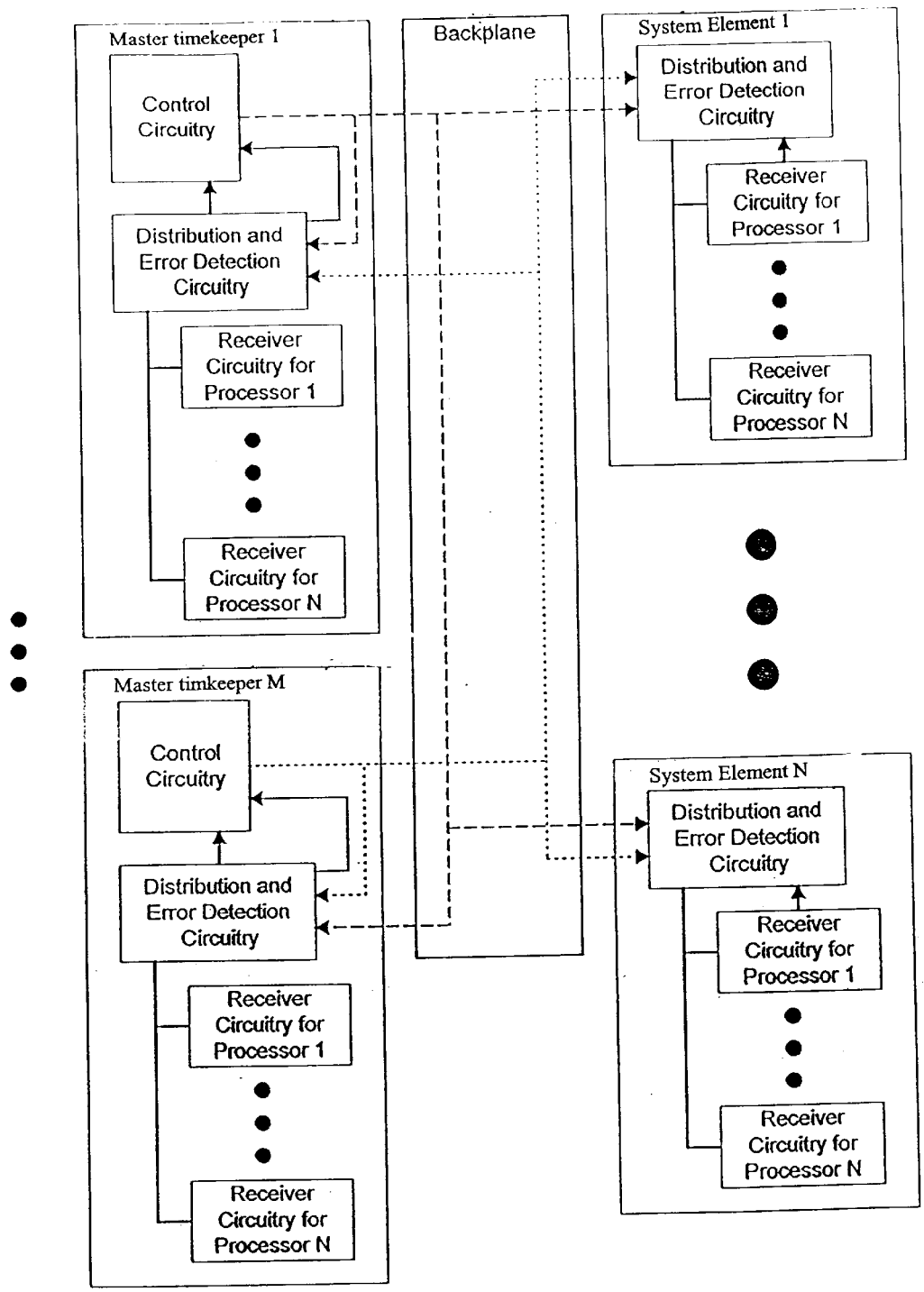
FIG. 3 is a detailed block diagram of the Real Time Stamp Distribution system.

As shown in FIG. 3, a single instantiation of the PWM decoder, error detection and error correction circuits can be shared among all processors of a network element, to reduce system resources. This is shown as the "Distribution and Error Detection Circuitry" block in FIG. 3. This sharing can be done on the receiving network elements, as well as on the master timekeeper.

The master timekeepers in FIG. 3 are broken down into a Control Circuit, (comprised of the PWM encoder, drift adjuster and master IRTS record), the Distribution and Error Detection Circuitry (described in the previous paragraph), and the Receiver Circuits for all the processors on the master timekeeper. The network elements shown in FIG. 3 are broken down into the Distribution and Error Detection Circuitry (described in the previous paragraph), and the Receiver Circuits for all the processors on the network elements.

A further embodiment of this invention incorporates multiple master timekeepers in a redundant configuration, as is also shown in FIG. 3. Knowing which master timekeeper is the currently active source of RTS updates, the network elements choose 25 the master timekeeper from which to accept updates. The inactive master timekeepers are all synchronized to the active master timekeeper in the same fashion as are the other network elements. All master timekeepers (active or inactive) transmit their RTS updates throughout the system. In this way, when a new master timekeeper becomes active, all network elements can seamlessly receive updates from the newly active master timekeeper. This master timekeeper redundancy is useful for fault recovery and improves system reliability.

Although several embodiments of the present invention have been described and illustrated it will be apparent to one skilled in the art that numerous changes can be made to the basic concept. It is to be understood, however that such changes will fall within the true scope of the invention as defined by the appended claims.

We claim:

1. A system for distributing a real time stamp (RST) between network elements in a multi-element network comprising:
    timing means at a master network element to derive a real time stamp;
    encoding means at the master network element to encode the real time stamp; and
    distribution means to distribute the real time stamp (RTS) to each remaining network element.

2. A system as defined in claim 1 wherein said RTS is distributed to each remaining network element over a dedicated hardware connection.

3. A system as defined in claim 1 wherein said RTS is divided into a high precision portion and a low precision portion.

4. A system as defined in claim 3 wherein said high precision portion of the RTS is distributed to each remaining network element over a dedicated hardware connection and said low precision portion is delivered by software messaging.

5. A system as defined in claim 1 wherein said RTS includes a high precision portion which is derived from an oscillator located on each remaining network element, a low precision portion which is distributed by software messaging and an intermediate portion that is distributed over a hardware connection.

6. A system as defined in claim 5 wherein each remaining element has a counter to maintain a record of the high precision portion of the RTS.

7. A system as defined in claim 5 wherein the intermediate portion of the RTS is implemented by a shifter-based counter at the network elements.

8. A system as defined in claim 7 wherein a linear feedback shift register is used as an intermediate real time stamp pattern.

9. A system as defined in claim 5 wherein a pulse width modulated encoder is used to transmit the intermediate real time stamp over a hardware line to the network elements.

10. A system as defined in claim 9 wherein each network element has a pulse width modulated decoder to derive the intermediate real time stamp.

11. A system as defined in claim 1 wherein the timing means at the master element receives the real time from an outside source and derives a real time stamp from the information received from the outside source.

12. A system as defined in claim 11 wherein the master element maintains a record of the real time stamp as distributed to the remaining network elements.

13. A system as defined in claim 12 wherein the master element has a drift adjuster which compares the distributed real time stamp with real time received from an outside source to determine whether a time drift has occurred.

14. A system as defined in claim 13 wherein said distributed real time stamp is adjusted to correspond to the real time from an outside source when a drift occurs.

15. A system as defined in claim 1 having multiple master network elements for redundancy, each having means to derive a real time stamp.

16. A system as defined in claim 15 wherein the network elements receive information as to which master network element is the current active source for providing RTS updates.

17. A system as defined in claim 16 wherein the multiple master timekeeping elements are synchronized to the active master timekeeper and all transmit RTS updates to network elements.

18. A method of distributing a real time stamp (RST) between network elements in a multi-element network comprising:
    providing timing means at a master network element to derive a real time stamp;
    providing encoding means at the master network element to encode the real time stamp; and
    providing distribution means to distribute the real time stamp (RTS) to each remaining network element.

19. The method of claim 18 wherein the real time stamp is divided into a high precision portion and a low precision portion and the high precision portion is delivered to network elements over a dedicated hardware connection and the low precision portion is delivered via software messaging.

20. The method of claim 18 wherein said RTS includes a high precision portion which is derived from an oscillator located on each remaining network element, a low precision portion which is distributed by software messaging and an intermediate portion that is distributed over a hardware connection.

* * * * *